Oct. 7, 1924.
P. H. RYLANDER
STERILIZER
Filed March 11, 1922
1,510,610
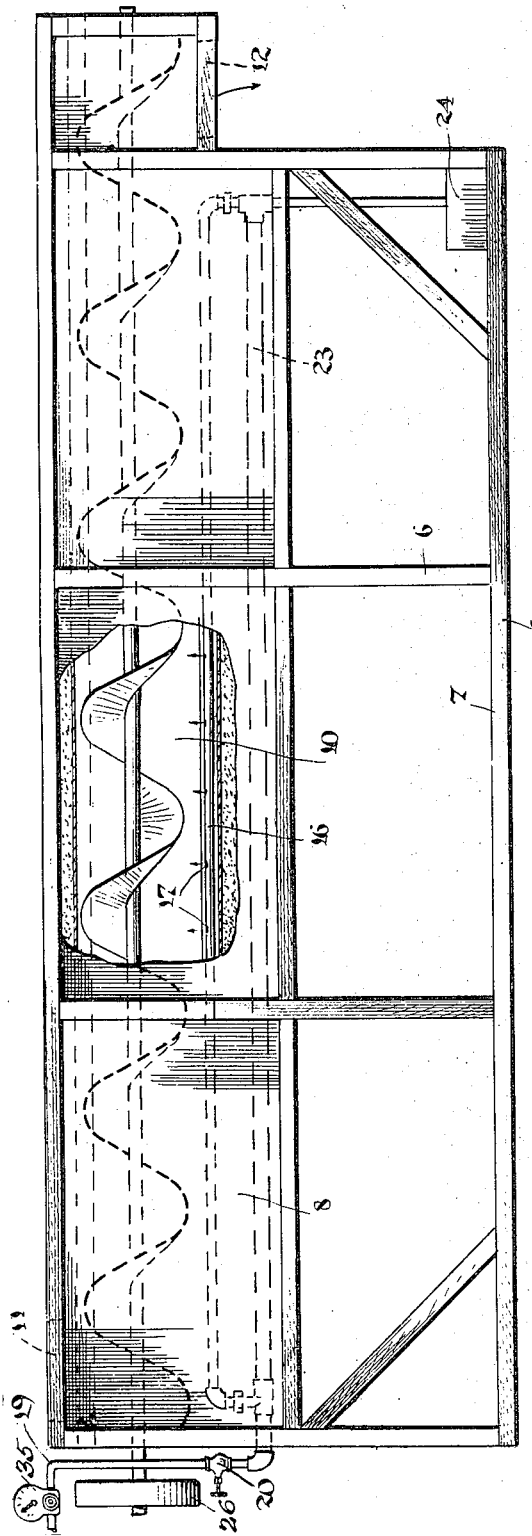
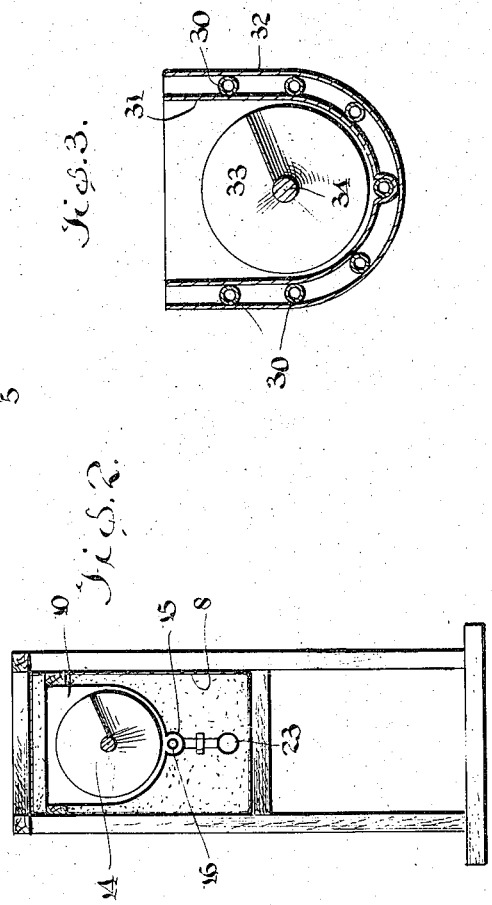
INVENTOR
P. H. Rylander,
BY
ATTORNEYS Patented Oct. 7, 1924.

1,510,610

UNITED STATES PATENT OFFICE.

PARRISH HENDRICKS RYLANDER, OF AUSTIN, TEXAS, ASSIGNOR TO THE RYLANDER COMPANY, A PARTNERSHIP COMPOSED OF W. P. RYLANDER, J. B. RYLANDER, AND P. H. RYLANDER, ALL OF TRAVIS COUNTY, TEXAS.

STERILIZER.

Application filed March 11, 1922. Serial No. 542,990.

*To all whom it may concern:*

Be it known that I, PARRISH H. RYLANDER, a citizen of the United States, and resident of Austin, in the county of Travis and State of Texas, have invented certain new and useful Improvements in Sterilizers, of which the following is a specification.

This invention relates to sterilizers especially adapted for destroying pink boll worms.

As is known the pink boll worms hibernate in the worm form on the inside of cotton seed and remain in this state many months before changing to the pupa state, and it is in this period of the life of the worm that it does the most damage. Also it is in this state only that the pink boll worm can be successfully attacked for the reason that after consuming most of the seeds in the boll it enters one or two of those remaining for a long period of rest spinning a web of very fine texture over the opening where it enters which can be penetrated most effectually by the application of live steam which kills almost instantly.

Briefly stated, an important object of this invention is to provide simple means whereby live steam may be applied directly to the cotton seeds at a temperature above 130 degrees F. for the purpose of destroying the worms, the temperature, however, being sufficiently low to prevent damage to the seed life.

A further object of the invention is to provide a treatment for cotton seed which will not only destroy the pink boll worms but will serve to prevent damage to the seed life from overheating when stored in bulk.

Further, by the live steam treatment of this improved sterilizing process the pores of the seed hull seem to open up thereby permitting the excessive moisture or sap resident in new or green seeds to be drawn out or extracted, thereby leaving the seeds in a cooled and ripened condition, practically immune from heating when stored in bulk.

A further object is to provide a sterilizer of the class described which is of highly simplified construction, durable in use and cheap to manufacture.

Other objects and advantages of the invention will be apparent during the course of the following description.

In the accompanying drawing forming part of this application and in which like numerals are employed to designate like parts throughout the same.

Figure 1 is a side elevation of the improved sterilizer.

Figure 2 is a vertical transverse sectional view through the same,

Figure 3 is a detailed sectional view illustrating a slightly modified form of the invention.

In the drawing wherein for the purpose of illustration is shown a preferred embodiment of the apparatus, the numeral five generally designates a frame, the said apparatus consisting of a plurality of legs 6 mounted on a base 7 and supporting a metal casing 8 within which the sterilization machinery operates.

In carrying out the invention a trough 10 is extended longitudinally within the casing 8 and the top of the apparatus is opened at one end as indicated at 11 for the reception of the seed to be treated, while the other end of the apparatus is formed with an extension having its lower side opened as indicated at 12 for the discharge of the treated material.

The trough 10 may be any desired shape in cross section, of solid or perforated sheet metal, and receives a spiral conveyor 14 which serves to move the material through the trough and discharge the same through the opening 12.

In carrying out the invention the bottom of the trough is provided preferably with a substantially cylindrical channel 15 through which a steam conveying pipe 16 is extended, the said feed pipe being provided with spaced steam discharge jets 17 as illustrated in Figure 1. The steam jets are of course formed on the upper side of the pipe 16 and are located at a point where they will most advantageously supply steam directly to the cotton seeds so as to heat to the desired temperature every seed entering the conveyor trough, thereby making certain 100% of pink boll worms killed.

The steam discharge pipe 16 has connection with a steam supply pipe 19 through pipe 23, which latter forms a receiver for the products of condensation and valve 20 of any suitable type is provided for controlling the supply of steam to the discharge pipe 16. Supply pipe 19 is provided with a reducing valve 35, in Fig. 1, its function being to accurately regulate the steam pressure, preventing a variable or over-supply of steam through valve 20 and resultant damage to the cotton seed. Condensed steam, or the bulk of it, in pipe 23 is drained off through steam trap 24 located at the end of the apparatus.

In operation the material is fed into the opening 11 and the spiral conveyor 14 is operated by means of a belt connected to the pulley 26 and the material is moved through the trough 10. As the material is moved through the trough it is subjected to the action of live steam which is properly regulated to heat the seeds to a temperature of 130 degrees Fahrenheit to a sufficient degree to kill the pink boll worms, and this temperature may be run up to 160 degrees Fahrenheit without danger of damage to the uninfested seeds, thereby leaving a safe mean between the two extremes as a thermal battleground for operating against the pink boll worm.

In operation the capacity of the machine may be readily varied by changing the speed of the conveyor for causing an increase or decrease in quantity of material passed through the apparatus.

Aside from killing the pink boll worm the direct application of live steam to cotton seeds will serve to prevent possible subsequent overheating when stored in bulk direct from the ginning operation to the seed house, or elsewhere, or at any subsequent time.

Further, the direct application of live steam and the heating of the seeds to temperature ranging from 130 to 160 degrees F. serves to open up the pores of the hull surrounding the kernel and enables any excessive moisture yet remaining in unripened or green seeds to escape, leaving the seeds in a cooled and ripened condition practically immune from damage resulting from heat usual to green seeds stored in bulk.

An experiment, conducted under the supervision of a Government official, to determine the effect on the seed of the slightly increased moisture deposit from steam condensation revealed the fact that many tons of seed heated to 145 degrees F. during the process of worm killing, and bulked, after twenty four hours the entire mass was normally dry and cool, conclusively proving that no harm can possibly come to cotton seed sterilized with live steam directly applied.

If desired, pipes 30 as in Fig. 3, may be arranged between the inner and outer wall 31 and 32 of the trough, or any number of troughs with proper connections arranged one above the other. Pipes 30 form conductors for the steam and cause the heat from the steam to radiate and prolong the heat term during which seed may be required to remain subjected to the thermal killing point of the process to effectively destroy the pink boll worm in cotton seed.

With reference to the foregoing description taken in connection with the accompanying drawing it will be seen that the pink boll worm is effectively destroyed by the direct application of steam thereto, the steam also acting as a means to make the uninfested cotton seed more or less immune from subsequent heating and resultant injury therefrom.

Having thus described the invention, what is claimed is:—

1. The herein described method of destroying the pink boll worm which consists in forcibly and uninterruptedly directing live steam in jet formation into a mass of cotton seeds passing in immediate contact with the source of steam supply for the purpose of destroying the pink boll worms hibernating in the seeds.

2. The method of destroying the pink boll worm which consists in forcibly and uninterruptedly directing live steam in jet formation to the seeds whereby to penetrate the web structure covering the hole in the seed which houses the boll worm thereby effecting complete mortality in a few seconds of time.

3. The method of destroying the pink boll worm which consists in subjecting cotton seeds to a steaming process which forcibly and immediately permeates the whole mass of seeds coming within a given compass thereby destroying the worms hibernating therein.

4. The herein described method of treating cotton seeds which consists in freely spraying live steam directly in contact with an enclosed and moving body of seeds, the seeds being heated to a temperature above 130° F. whereby to destroy the destructive agent within the seed whether of insect life or excessive moisture inherent in new seeds.

5. An apparatus of the class described comprising a trough having its lower portion formed with a channel the upper side of which is open, a steam discharge pipe extending through said channel and having spaced jets adapted for directing the steam into contact with the material passing through the trough.

6. An apparatus for destroying the pink boll worm during hibernation in cotton seeds which consists of a trough having its lower side formed with a channel, the upper side of the channel being opened, a steam discharge pipe extending through said channel and having discharge jets adapted for supplying live steam directly to the cotton seeds in said trough and means whereby to move the cotton seeds through the trough.

7. An apparatus for destroying the pink boll worm during hibernation in cotton seed which consists of a trough having its lower side formed with a channel, the upper side having continuous or spaced openings, a steam discharge pipe extending through said channel and having steam discharge jets for supplying live steam directly to the cotton seeds in said trough, suitable gauges to determine the correct amount of steam flowing into the said discharge pipe for distribution into the contents of the trough, and means whereby to move said contents through the trough and super heating pipes arranged adjacent said trough.

8. The herein described method of treating cotton seed, ginned or unginned, which consists in forcibly and uninterruptedly applying live steam to the seed while they are moving over a succession of jets in a pipe, paralleling, in close proximity to, the propelling means whereby to kill the pink boll worm hibernating in the seed and to render the uninfested seeds so treated immune to damage from generated heat while subsequently stored in bulk.

PARRISH HENDRICKS RYLANDER.